June 10, 1969  P. SIDLES, JR  3,448,841
HYDRAULIC ACTUATING MEANS FOR TRACTOR STEERING CLUTCHES
Filed March 28, 1967  Sheet 1 of 3
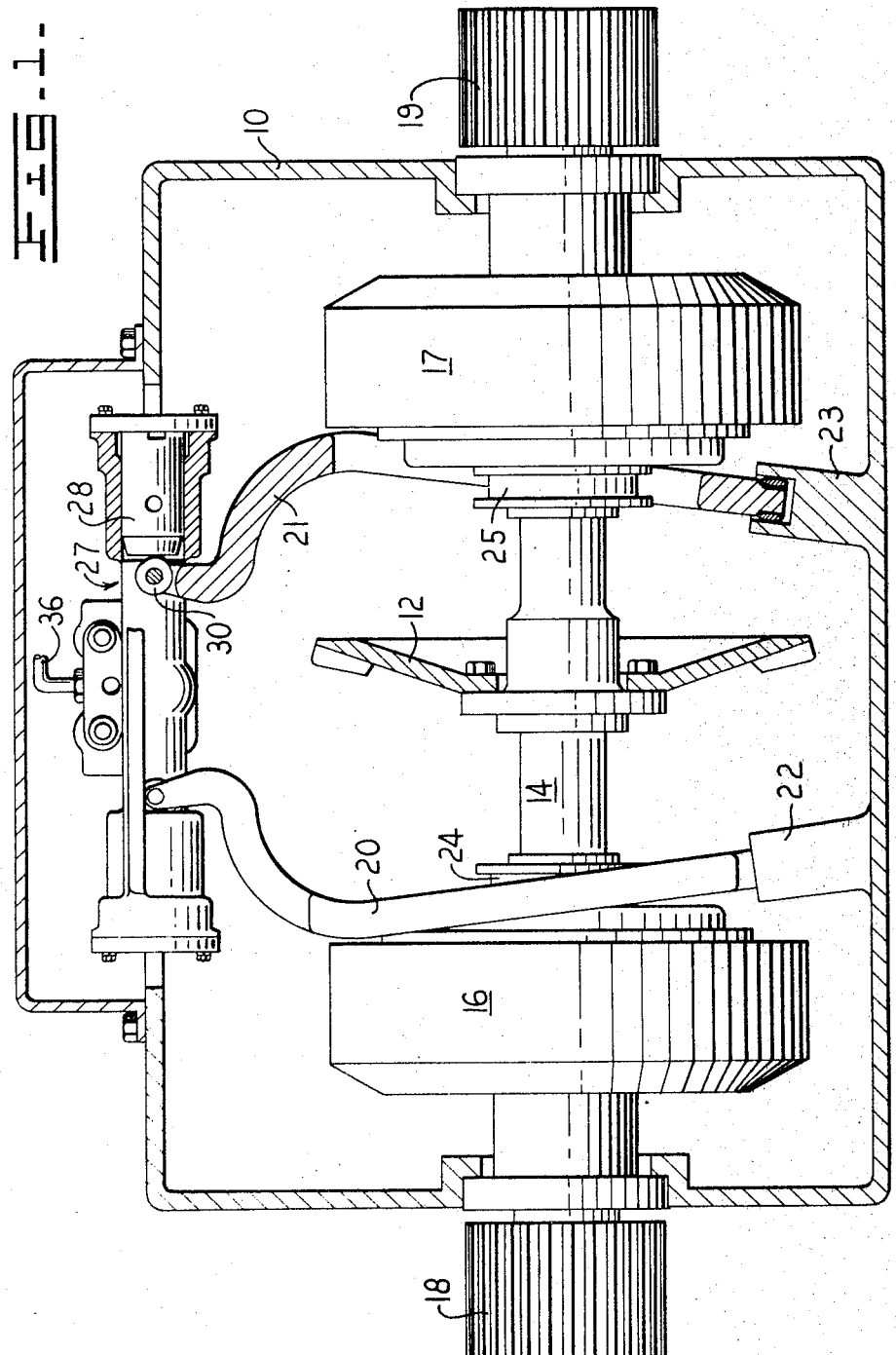
INVENTOR.
PETER SIDLES JR.
BY *[signature]*
ATTORNEYS

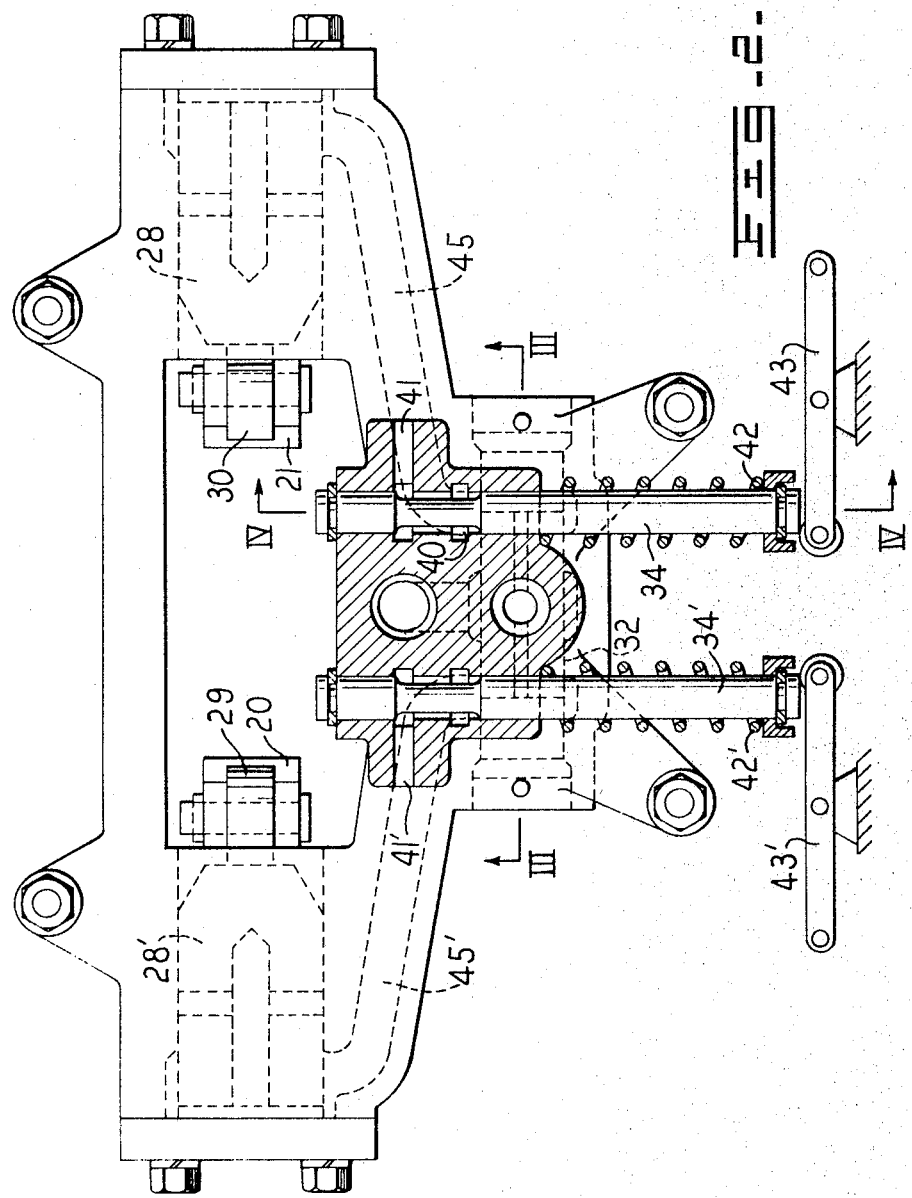

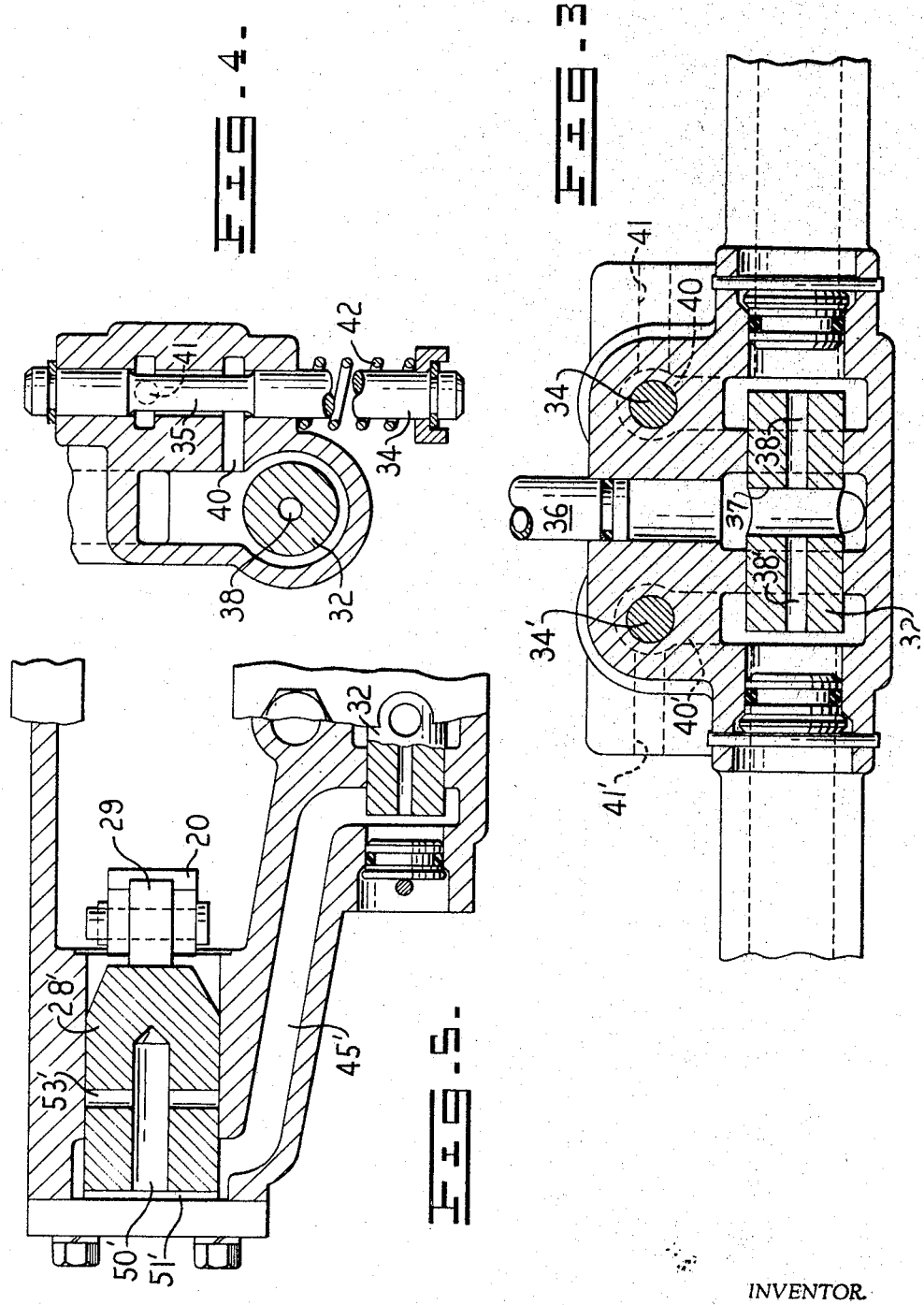

United States Patent Office 3,448,841
Patented June 10, 1969

---

3,448,841
HYDRAULIC ACTUATING MEANS FOR TRACTOR STEERING CLUTCHES
Peter Sidles, Jr., North Aurora, Ill., assignor to Caterpillar Tractor Co., Peoria, Ill., a corporation of California
Filed Mar. 28, 1967, Ser. No. 626,491
Int. Cl. F16d 21/08, 25/00, 19/00
U.S. Cl. 192—87.13                                  2 Claims

ABSTRACT OF THE DISCLOSURE

A hydraulic clutch disengaging device in which a fluid actuated piston is in direct engagement with each of two steering clutch yokes avoiding side thrust and periodic adjustments of conventional interconnecting linkages, together with a simple combination of control valves and flow divider which enables the use of fluid under relatively low pressure and low friction conditions.

---

The present invention pertains to the steering of tractors wherein steering is accomplished by driving or by braking. Controls for such steering are disclosed in my assignee's United States patent to Ehlke, et al. No. 3,262,525. The device disclosed in such patent shows hydraulic means for transmitting clutch disengaging force to either of two steering clutches. The clutches are in the drive trains of track on opposite sides of the tractor so disengagement of either clutch causes driving on one side only and thus causes steering in a well known manner.

It is the object of the present invention to provide improved hydraulic actuating means for steering clutches and particularly to provide means wherein forces are directed to the clutch disengaging yokes without interconnecting linkage.

Further and more specific objects and advantages of the invention and the manner in which the invention is carried into practice are made apparent in the following specification wherein reference is made to the accompanying drawings.

In the drawings:

FIG. 1 is a vertical sectional view through the final drive housing of a tractor showing the steering clutches thereof and showing the control valve and actuating assembly of the present invention;

FIG. 2 is an enlarged view looking downwardly on the control valve and actuating assembly with parts illustrated in section;

FIG. 3 is a sectional view taken on the line III—III of FIG. 2;

FIG. 4 is a sectional view taken on the line IV—IV of FIG. 2; and

FIG. 5 is a view in section showing an actuating piston and a part of a flow divider which is shown in FIG. 3.

FIG. 1 shows a part of the final drive of a conventional track-type tractor contained in a housing 10 and comprising a bevel gear 12 which is driven by a bevel pinion (not shown) on the drive shaft of the tractor. The bevel gear 12 is affixed to and drives a shaft 14 which through clutches, generally indicated at 16 and 17, imparts driving motion to spur gears 18 and 19 coupled through further reduction gearing (not shown) to the driving sprockets of the track type tractor or to the driving wheels of a wheel type tractor in some cases.

The steering clutches 16 and 17 are of a conventional type which are engaged by spring pressure and disengaged manually generally with the aid of hydraulic means by yokes 20 and 21 pivotally supported in anchor members 22 and 23 on the bottom of the housing 10 and having means (not shown) engaged with grooved collars 24 and 25 for retracting the clutches.

All of the mechanism disclosed to this point is conventional and the present invention pertains to the control and hudraulic means for swinging either or both of the yokes 20 and 21 inwardly as viewed in FIG. 1 for retracting the collars 24 and 25 to disengage the clutches. The hydraulic control assembly is generally indicated at 27 in FIG. 1 and has two pistons, one of which is shown at 28 operable under hydraulic pressure to engage one of two anti-friction rollers 29 and 30 (see also FIG. 2) on the ends of the yokes 20 and 21. Controls for directing hydraulic fluid under pressure to either or both of the actuating pistons are shown as comprising a flow divider 32 (see FIGS. 3 and 4) and two control valves including spools 34 and 34' also shown in FIG. 3 as well as in FIG. 1. The spool 34 controls flow of fluid to the piston 28 and the valve spool 34' controls flow to the other piston which is indicated at 28' in FIG. 2.

Under normal conditions with both steering clutches engaged, fluid under pressure from a source (not shown) enters the area of the flow divider 32 through a line 36 (see FIG. 3) and passes through a central radial bore 37 and, in equal amounts, through two connecting axial bores 38 and 38'. The fluid then passes into the bore which houses the valve spools 34 and 34' by way of passages, one of which is shown at 40 in FIG. 4, and both of which appear in dotted lines at 40 and 40' in FIG. 3. These passages communicate with reliefs in the spools, one of which is shown at 35 in FIG. 4 and fluid is communicated by way of these reliefs to spill ports 41 and 41' (see also FIG. 3). Thus the fluid passing through the valve has very little restriction to flow and enters the final drive housing where it has cooling effect upon the clutches therein.

The valve spools 34 and 34' are normally held in their retracted or open position shown by springs 42 and 42', respectively as best shown in FIG. 2, and they may be closed by manual or pedal actuated linkage, the final links of which are shown at 43 and 43' in FIG. 2 pivotally supported and engageable through suitable anti-friction means with the ends of the spools. Assuming that the left steering clutch 16 is to be disengaged, linkages actuated depress the spool 34' and its full diameter adjacent the relieved area 35 moves inwardly to close communication between the passage 40' and the spill port 41' shown in FIGS. 3 and 4. Passages 45 and 45' (see FIGS. 2 and 5) communicate between opposite ends of the flow divider 32 and the pistons 28 and 28'. When the valve 34' is closed, fluid normally flowing through it is blocked which causes a pressure buildup in passage 45' urging the flow divider 32 in the opposite direction where it acts as a valve restricting the flow to the open valve 34 creating a balanced pressure condition on the ends of the divider 32. In this manner, the fluid normally flowing through valve 34' will flow through 45' and actuate piston 28'. The pistons 28 and 28' are identical and have central bores as shown at 50' in FIG. 5 to which fluid is communicated from passage 45' by way of a recess 51' in the head of the piston to advance it for disengaging its associated clutch. Movement of the piston is limited by radial bores 53' which upon registering with the end of the cylinder in which the piston reciprocates will exhaust the oil into the final drive housing.

Because of the proximity of the several parts to each other, there is very little restriction to flow of oil under pressure when the valves are open. When a single valve is closed, the arrangement of the flow divider is such that it acts as a valve to restrict flow to the opposite control valve and actuating piston though if both control valves are closed a the same time, the flow divider will be balanced centrally and both actuating pistons will function to disengage their respective clutches.

I claim:
1. In a tractor having a pair of steering clutches in its drive train, means including a yoke to effect disengagement of each clutch to interrupt driving on one side of the tractor, the improvement which comprises a hydraulic circuit, a cylinder in said circuit adjacent each yoke, a piston in each cylinder directly engageable with the associated yoke, means to direct fluid under pressure in the system selectively to the cylinders to advance the pistons therein for disengaging the clutches, a flow divider interposed between the source and the two valves, and a movable part associated with the flow divider actuated by back pressure upon closing of either valve to restrict flow to the other valve.

2. The combination of claim 1 in which the pistons, valves and flow divider are all contained in a common housing.

References Cited

UNITED STATES PATENTS 2,392,423   1/1946   Stephens _____ 192—13
2,897,787   8/1959   Kivisto et al. _____ 180—6.7 X
3,262,525   7/1966   Ehlke et al. _____ 192—87.13 X BENJAMIN W. WYCHE III, *Primary Examiner.*

U.S. Cl. X.R.

180—6.7; 192—13, 91